United States Patent [19]
Brown et al.

[11] Patent Number: 5,193,055
[45] Date of Patent: Mar. 9, 1993

[54] ACCOUNTING SYSTEM

[76] Inventors: Gordon T. Brown; Richard H. Scherer, both of 631 Iron City Dr., Pittsburgh, Pa. 15205

[21] Appl. No.: 640,542

[22] Filed: Jan. 14, 1991

Related U.S. Application Data

[63] Continuation of Ser. No. 280,220, Dec. 5, 1988, abandoned, which is a continuation-in-part of Ser. No. 21,249, Mar. 3, 1987, abandoned.

[51] Int. Cl.$^5$ .............................................. G06F 15/30
[52] U.S. Cl. ..................................... 364/406; 364/401
[58] Field of Search ........................ 364/401, 406, 419

[56] References Cited

U.S. PATENT DOCUMENTS

| | | | |
|---|---|---|---|
| 2,509,718 | 5/1950 | Barbey | 235/61 |
| 2,693,909 | 11/1954 | Allan | 235/61.12 |
| 3,040,984 | 6/1962 | Cox et al. | 235/153 |
| 3,492,655 | 1/1970 | Deskevich et al. | 340/172.5 |
| 3,623,012 | 11/1971 | Lowry | 340/172.5 |
| 3,749,892 | 7/1973 | Stenning | 235/150.5 |
| 4,222,109 | 9/1980 | Siwula | 364/715 |
| 4,264,808 | 4/1981 | Owens | 235/379 |
| 4,277,837 | 7/1981 | Stuckert | 364/900 |
| 4,308,588 | 12/1981 | Siwula | 364/715 |
| 4,321,672 | 3/1982 | Braun et al. | 364/408 |
| 4,370,649 | 1/1983 | Fuerle | 340/825 |
| 4,376,978 | 3/1983 | Musmanno | 364/408 |
| 4,412,287 | 10/1983 | Braddock | 364/408 |
| 4,460,965 | 7/1984 | Trehn et al. | 364/464 |
| 4,549,264 | 10/1985 | Carroll | 364/406 |
| 4,569,029 | 2/1986 | Hatta et al. | 364/715 |
| 4,594,663 | 6/1986 | Nagata et al. | 364/401 |

OTHER PUBLICATIONS

Wilkens, Robert P., "How Lawyers Can Use Microcomputers", Byte Magazine May, 1984 pp. 160–167.
Dow Jones General Ledge, Byte Magazine May, 1984.
"Recordkeeping for Small Businesses", 1985, by Tom Harrison.

*Primary Examiner*—Gail O. Hayes
*Attorney, Agent, or Firm*—Walter J. Blenko, Jr.

[57] ABSTRACT

A system for producing accounting statements. A standard category code listing is developed and entered into a computer data bank. Data are entered from blank statements and check book entries in accordance with the standard category code listing, and accounting statements are printed.

5 Claims, 25 Drawing Sheets

INCOME

1000 DEPOSITS (Cash Receipts)

1010   Sales - Taxable
      1020   Sales - Tax Exempt
      1030   Sales - Tax Collected

1100 SERVICES INCOME

1110   Salaries & Wages
      1120   Commission Income
      1130   Consulting Fees
      1140   Bonus Income

1200 INCOME FROM ASSETS

1210   Rent
      1220   Dividends
      1230   Profit Sharing
      1240   Pension Income
      1250   Insurance Proceeds
      1260   Estate Distribution
      1270   Principal or Note
      1280   Royalties

1300 INTEREST EARNED

1310   Taxable
      1320   Tax Free - Federal
      1330   Tax Free - State

1400 SERVICE CHARGES

1500 DEPOSIT OF NSF CHECKS

1600 ADVANCES

1700 TRANSFER OF CHECKS

1710   From Personal Account or Savings
      1720   From Business Account
      1730   From Escrow

1800 MISCELLANEOUS RECEIPTS AND DEPOSITS 1890-1899 PERSONALIZED CATEGORY CODES

Figure 2A

BUSINESS EXPENSES

3000 OFFICE EXPENSE
    3010 Rent
    3020 Mortgage Payments
    3030 Utilities
    3040 Telephone
    3050 Copier Rental or Purchase Payments
    3060 Furniture & Fixtures
    3070 Repairs/Maintenance
    3080 Security
    3090 Miscellaneous
    3100 Office Supplies
    3110 Paper & Printing
    3120 Postage & Express
    3130 Other Supplies
    3190-3199 Persl. Cat. Codes 3300 TRAINING
    3310 Meeting Expense
    3320 Training Sessions
    3330 Equipment-Depreciable
    3340 Equipment-Nondeprec.
    3350 Other Expense
    3390-3399 Persl. Cat. Codes 3500 TRAVEL & ENTERTAINMENT
    3510 Automobile Purchase
    3520 Automobile Rental
    3530 Auto Expenses
    3540 Other Transportation
    3550 Meals & Enter. (80%)
    3560 Lodging
    3570 Other Travel/Enter.
    3590-3599 Persl. Cat. Codes 3800 ADVERTISING
    3810 Agency Fees
    3820 Media
    3830 Co-op Costs
    3840 Misc. Advertising
    3890-3899 Persl. Cat. Codes 4000 WAGES & SALARIES
    4010 Officers' Salaries
    4020 Payroll
    4030 Payroll Taxes
    4040 FICA
    4050 Pension & Profit Sharing
    4060 Unemployment Taxes
    4070 Health Insurance
    4080 Employee Insurance
    4090-4099 Persl. Cat. Codes 4300 INSURANCE
    4310 Property
    4320 Liability
    4330 Casualty
    4340 Fire
    4350 Auto/Truck
    4360 Other Insurance
    4390-4399 Persl. Ct. Codes 4500 COMMISSIONS PAID
    4510 Commissions Paid
    4520 Legal
    4530 Accounting
    4540 Licenses
    4550 Consulting
    4560 Education
    4570 Other Professional
    4590-4599 Persl. Cat. Codes 4800 INTEREST EXPENSE
    4810 Mortgage Interest
    4820 Interest on Bank Loans
    4830 Asset Financing
    4890-4899 Persl. Cat. Codes 5000 TAXES
    5010 Federal Income Tax
    5020 State Income Tax
    5030 Local/Municipal In. Tax
    5040 Real Estate Tax
    5050 Sales Tax
    5060 Excise Tax
    5070 Personal Property Tax
    5080 Other Taxes
    5090-5099 Personl. Cat. Codes 5300 PREPAID EXPENSES
    5310 Taxes
    5320 Insurance
    5330 Notes
    5340 Other
    5390-5399 Persl. Cat. Codes 5500 GENERAL BUSINESS MISCELLANEOUS EXPENSES
    5510 NSF Checks
    5520 Bank Charges
    5530 Freight
    5540 Research & Development
    5590-5500 Persl. Cat. Codes 6000 INVENTORY
    6010-6199 Pers. Inven. Codes

8999 SUSPENSE AMOUNT

Figure 2B

PERSONAL EXPENSES

7000 PERSONAL/FAMILY EXPENSE

7010  Food
    7020  Clothing
    7030  Medical/Dental
    7040  Education
    7050  Home Maintenance/Repair
    7060  Donations
    7070  Utilities
    7080  Credit Card
    7090  Vacation/Entertainment
    7100  Dues/Memberships
    7110  Automobile
    7120  Taxes
    7130  Telephone
    7140  Loan Repayments
    7150  Furniture/Fixtures
    7160  Legal
    7170  Insurance
    7180  Other Personal
    7190  Checks for Cash
    7200  For Transfer to Savings
    7210  For Investments
    7220  For Transfer to Business Accounts
    7230  For Home Office Expense
    7290-7299  Personalized Category Codes

Figure 2C

ASSET EXPENSES

9000 PURCHASE OF DEPRECIABLE ASSETS 9001   1 Year - Straight Line
    9002   2 Year - Straight Line
    9003   3 Year - Straight Line
    9004   4 Year - Straight Line
    9005   5 Year - Straight Line
    9006   6 Year - Straight Line
    9007   7 Year - Straight Line
    9008   8 Year - Straight Line
    9009   9 Year - Straight Line
    9010  10 Year - Straight Line
    9011  11 Year - Straight Line
    9012  12 Year - Straight Line
    9013  13 Year - Straight Line
    9014  14 Year - Straight Line
    9015  15 Year - Straight Line

9100 PURCHASE OF DEPRECIABLE ASSETS 9103   3 Year - Double Declining - Balance
    9105   5 Year - Double Declining - Balance
    9107   7 Year - Double Declining - Balance
    9110  10 Year - Double Declining - Balance

9200 PURCHASE OF DEPRECIABLE ASSETS 9201   1 Year - Sum of the Digits
    9202   2 Year - Sum of the Digits
    9203   3 Year - Sum of the Digits
    9204   4 Year - Sum of the Digits
    9205   5 Year - Sum of the Digits
    9206   6 Year - Sum of the Digits
    9207   7 Year - Sum of the Digits
    9208   8 Year - Sum of the Digits
    9209   8 Year - Sum of the Digits
    9210  10 Year - Sum of the Digits

9300 DEPLETION

9400 ASSET PAYMENTS

9410  Car Loan
    9420  Office Equipment
    9430  Other Payments
    9490-9499  Personalized Category Codes

9500 AMORTIZATION

Figure 2D

MARCH STATEMENT OF FAST FINANCIAL ACTIVITY - 4129282850 KELLY CANDY
BANK STATEMENT MONTH END BALANCE $30,608.63

| | | CURRENT MONTH | CURRENT YTD | PREVIOUS YTD | CRNT VS PREV |
|---|---|---|---|---|---|
| 1010 | SALES - TAXABLE | $57,210.53 | $86,028.35 | $ .00 | $86,028.35 |
| 1110 | SALARIES & WAGES | .00 | .00 | .00 | .00 |
| 1260 | ESTATE DISTRIBUTION | .00 | 7,000.00 | .00 | 7,000.00 |
| 3005 | RENT | 900.00 | 1,800.00 | .00 | 1,800.00 |
| 3015 | UTILITIES | 189.10 | 450.82 | .00 | 450.82 |
| 3020 | TELEPHONE | 60.05 | 160.05 | .00 | 160.05 |
| 3025 | COPIER RENTAL OR PURCHASE PAYMENTS | 277.78 | 555.56 | .00 | 555.56 |
| 3030 | FURNITURE & FIXTURES | 1,327.00 | 1,327.00 | .00 | 1,327.00 |
| 3035 | REPAIRS & MAINTENANCE | .00 | 110.00 | .00 | 110.00 |
| 3045 | MISCELLANEOUS | .00 | 175.00 | .00 | 175.00 |
| 3050 | OFFICE SUPPLIES | 250.67 | 250.67 | .00 | 250.67 |
| 3055 | PAPER & PRINTING | .00 | 342.60 | .00 | 342.60 |
| 3060 | POSTAGE & EXPRESS | 27.00 | 111.00 | .00 | 111.00 |
| 3065 | OTHER SUPPLIES | .00 | 31.00 | .00 | 31.00 |
| 3310 | MEETING EXPENSE | .00 | 165.00 | .00 | 165.00 |
| 3530 | AUTO EXPENSES | 44.25 | 86.50 | .00 | 86.50 |
| 3540 | OTHER TRANSPORTATION | .00 | 225.00 | .00 | 225.00 |
| 3550 | MEALS AND ENTERTAINMENT (80%) | .00 | 35.00 | .00 | 35.00 |
| 3560 | LODGING | .00 | 113.00 | .00 | 113.00 |
| 3570 | OTHER TRAVEL & ENTERTAINMENT | 82.00 | 82.00 | .00 | 82.00 |
| 3830 | CO-OP COSTS | .00 | 1,350.00 | .00 | 1,350.00 |
| 4010 | OFFICER'S SALARIES | 2,000.00 | 6,000.00 | .00 | 6,000.00 |
| 4020 | PAYROLL | 281.67 | 581.67 | .00 | 581.67 |
| 4030 | PAYROLL TAXES | 345.00 | 390.00 | .00 | 390.00 |
| 4050 | PENSION & PROFIT SHARING | .00 | 1,500.00 | .00 | 1,500.00 |
| 4070 | HEALTH INSURANCE | 189.00 | 567.00 | .00 | 567.00 |

Figure 3A

MARCH STATEMENT OF FAST FINANCIAL ACTIVITY - 4129282850 KELLY CANDY
BANK STATEMENT MONTH END BALANCE $30,608.63

| | | CURRENT MONTH | CURRENT YTD | PREVIOUS YTD | CRNT VS PREV |
|---|---|---:|---:|---:|---:|
| 4310 | PROPERTY | $ .00 | $ 700.00 | $ .00 | $ 700.00 |
| 4340 | FIRE | .00 | 400.00 | .00 | 400.00 |
| 4520 | LEGAL | 250.00 | 250.00 | .00 | 250.00 |
| 4530 | ACCOUNTING | .00 | 225.00 | .00 | 225.00 |
| 4820 | INTEREST ON BANK LOANS | 41.67 | 752.51 | .00 | 752.51 |
| 5050 | SALES TAX | 3,761.00 | 4,511.00 | .00 | 4,511.00 |
| 5320 | INSURANCE | 2,400.00 | 2,400.00 | .00 | 2,400.00 |
| 5520 | BANK CHARGES | 16.00 | 16.00 | .00 | 16.00 |
| 5530 | FREIGHT | 67.00 | 519.00 | .00 | 519.00 |
| 6010 | MARSHMALLOW CREME | .00 | 1,001.00 | .00 | 1,001.00 |
| 6012 | SUGAR | 325.00 | 1,754.00 | .00 | 1,754.00 |
| 6015 | CHERRIES | .00 | 375.00 | .00 | 375.00 |
| 6018 | SOLID CHOCOLATE | .00 | 3,200.00 | .00 | 3,200.00 |
| 6020 | MOLASSES | 300.00 | 300.00 | .00 | 300.00 |
| 6040 | CASHEW PIECES | .00 | 1,625.00 | .00 | 1,625.00 |
| 6050 | CARAMEL SAUCE | .00 | 1,200.00 | .00 | 1,200.00 |
| 7003 | FOOD | 72.12 | 509.99 | .00 | 509.99 |
| 7006 | CLOTHING | 95.00 | 220.00 | .00 | 220.00 |
| 7009 | MEDICAL/DENTAL | .00 | 117.70 | .00 | 117.70 |
| 7012 | EDUCATION | .00 | 50.00 | .00 | 50.00 |
| 7015 | HOME MAINTENANCE/REPAIR | .00 | 496.95 | .00 | 496.95 |
| 7018 | DONATIONS | .00 | 175.00 | .00 | 175.00 |
| 7021 | HOME UTILITIES | 185.55 | 320.95 | .00 | 320.95 |
| 7024 | CREDIT CARDS | .00 | 67.50 | .00 | 67.50 |
| 7027 | VACATION/ENTERTAINMENT | .00 | 87.00 | .00 | 87.00 |
| 7030 | DUES/MEMBERSHIP | 150.00 | 150.00 | .00 | 150.00 |

Figure 3B

MARCH STATEMENT OF FAST FINANCIAL ACTIVITY - 4129282850 KELLY CANDY
BANK STATEMENT MONTH END BALANCE $30,608.63

|  |  | CURRENT MONTH | CURRENT YTD | PREVIOUS YTD | CRNT VS PREV |
|---|---|---|---|---|---|
| 7033 | AUTOMOBILE | $ 52.90 | $ 368.45 | $ .00 | $ 368.45 |
| 7036 | TAXES | .00 | 300.00 | .00 | 300.00 |
| 7039 | TELEPHONE | 37.96 | 55.46 | .00 | 55.46 |
| 7045 | FURNITURE/FIXTURES | .00 | 427.34 | .00 | 427.34 |
| 7051 | INSURANCE | 320.00 | 570.00 | .00 | 570.00 |
| 7057 | CHECKS FOR CASH | .00 | 2,250.00 | .00 | 2,250.00 |
| 7060 | FOR TRANSFER TO SAVINGS | 1,000.00 | 1,000.00 | .00 | 1,000.00 |
| 9003 | 3 YEAR-STRAIGHT LINE | 416.00 | 416.00 | .00 | 416.00 |
| 9004 | 4 YEAR-STRAIGHT LINE | .00 | 15,000.00 | .00 | 15,000.00 |
| 9005 | 5 YEAR-STRAIGHT LINE | .00 | 5,000.00 | .00 | 5,000.00 |
| 9010 | 10 YEAR-STRAIGHT LINE | 4,200.00 | 4,200.00 | .00 | 4,200.00 |

Figure 3C

PAST FINANCIALS RECAP BY MONTH - 4129282850 KELLY CANDY

THIS RECAP REFLECTS DOLLAR AMOUNTS ONLY - ALL CENT AMOUNTS HAVE BEEN DROPPED FROM REPORT EXCEPT FOR BALANCE AMOUNTS AT THE END OF REPORT.

| CATEGORY | JAN | FEB | MAR | APR | MAY | JUN | JUL | AUG | SEP | OCT | NOV | DEC |
|---|---|---|---|---|---|---|---|---|---|---|---|---|
| BEG BAL | 5,000 | 928 | 6,938- | 30,608 | | | | | | | | |
| 1010 | 8,353 | 20,463 | 57,210 | | | | | | | | | |
| DEPOSITS | 8,353 | 20,463 | 57,210 | | | | | | | | | |
| 1260 | | 7,000 | | | | | | | | | | |
| ASSET INCM | | 7,000 | | | | | | | | | | |
| 3005 | 450- | 450- | 900- | | | | | | | | | |
| 3015 | 261- | | 189- | | | | | | | | | |
| 3020 | 100- | | 60- | | | | | | | | | |
| 3025 | 138- | 138- | 277- | | | | | | | | | |
| 3030 | | | 1,327 | | | | | | | | | |
| 3035 | | 110- | | | | | | | | | | |
| 3045 | | 175- | | | | | | | | | | |
| 3050 | | | 250- | | | | | | | | | |
| 3055 | 342- | | | | | | | | | | | |
| 3060 | 75- | 9- | 27- | | | | | | | | | |
| 3065 | | 31- | | | | | | | | | | |
| OFFICE EXP | 1,366 | 913 | 3,030 | | | | | | | | | |
| 3310 | | 165- | | | | | | | | | | |
| TRAINING | | 165 | | | | | | | | | | |

Figure 4A

FAST FINANCIALS RECAP BY MONTH - 4129282850 KELLY CANDY

THIS RECAP REFLECTS DOLLAR AMOUNTS ONLY - ALL CENT AMOUNTS HAVE BEEN DROPPED FROM REPORT EXCEPT FOR BALANCE AMOUNTS AT THE END OF REPORT.

| CATEGORY | JAN | FEB | MAR | APR | MAY | JUN | JUL | AUG | SEP | OCT | NOV | DEC |
|---|---|---|---|---|---|---|---|---|---|---|---|---|
| 3530 | 42- | | | | | | | | | | | |
| 3540 | | 225- | 44- | | | | | | | | | |
| 3550 | 35- | | | | | | | | | | | |
| 3560 | 113- | | | | | | | | | | | |
| 3570 | | | 82- | | | | | | | | | |
| TRAVEL/ENT | 190 | 225 | 126 | | | | | | | | | |
| 3830 | | 1,350- | | | | | | | | | | |
| ADVERTISING | | 1,350 | | | | | | | | | | |
| 4010 | 2,000- | 2,000- | 2,000- | | | | | | | | | |
| 4020 | | 300- | 281- | | | | | | | | | |
| 4030 | 45- | | 345- | | | | | | | | | |
| 4050 | | 1,500- | | | | | | | | | | |
| 4070 | 189- | 189- | 189- | | | | | | | | | |
| PAYROLL | 2,234 | 3,989 | 2,815 | | | | | | | | | |
| 4310 | 700- | | | | | | | | | | | |
| 4340 | 400- | | | | | | | | | | | |
| INSURANCE | 1,100 | | | | | | | | | | | |

Figure 4B

FAST FINANCIALS RECAP BY MONTH - 4129282850 KELLY CANDY

THIS RECAP REFLECTS DOLLAR AMOUNTS ONLY - ALL CENT AMOUNTS HAVE BEEN DROPPED FROM REPORT EXCEPT FOR BALANCE AMOUNTS AT THE END OF REPORT.

| CATEGORY | JAN | FEB | MAR | APR | MAY | JUN | JUL | AUG | SEP | OCT | NOV | DEC |
|---|---|---|---|---|---|---|---|---|---|---|---|---|
| 4520 | | | 250- | | | | | | | | | |
| 4530 | | 225- | | | | | | | | | | |
| LICENSING | | 225 | 250 | | | | | | | | | |
| 4820 | 41- | 669- | 41- | | | | | | | | | |
| INTEREST EXP | 41 | 669 | 41 | | | | | | | | | |
| 5050 | | 750- | 3,761- | | | | | | | | | |
| TAXES | | 750 | 3,761 | | | | | | | | | |
| 5320 | | | 2,400- | | | | | | | | | |
| PREPAID EXP | | | 2,400 | | | | | | | | | |
| 5520 | 87- | | 16- | | | | | | | | | |
| 5530 | | 365- | 67- | | | | | | | | | |
| MISC EXP | 87 | 365 | 83 | | | | | | | | | |
| 6010 | 600- | 401- | | | | | | | | | | |
| 6012 | 350- | 1,079- | 325- | | | | | | | | | |
| 6015 | | 375- | | | | | | | | | | |
| 6018 | | 3,200- | | | | | | | | | | |
| 6020 | | | 300- | | | | | | | | | |

Figure 4C

FAST FINANCIALS RECAP BY MONTH - 4129282850 KELLY CANDY

THIS RECAP REFLECTS DOLLAR AMOUNTS ONLY - ALL CENT AMOUNTS HAVE BEEN DROPPED FROM REPORT EXCEPT FOR BALANCE AMOUNTS AT THE END OF REPORT.

| CATEGORY | JAN | FEB | MAR | APR | MAY | JUN | JUL | AUG | SEP | OCT | NOV | DEC |
|---|---|---|---|---|---|---|---|---|---|---|---|---|
| 6040 | | 1,625- | | | | | | | | | | |
| 6050 | | 1,200- | | | | | | | | | | |
| INVENTORY | 950 | 7,880 | 625 | | | | | | | | | |
| 7003 | 204- | 233- | 72- | | | | | | | | | |
| 7006 | 30- | 125- | 95- | | | | | | | | | |
| 7009 | 30- | 87- | | | | | | | | | | |
| 7012 | 50- | | | | | | | | | | | |
| 7015 | 61- | 435- | | | | | | | | | | |
| 7018 | 100- | 75- | | | | | | | | | | |
| 7021 | 135- | | 185- | | | | | | | | | |
| 7024 | 67- | | | | | | | | | | | |
| 7027 | | 87- | | | | | | | | | | |
| 7030 | | | 150- | | | | | | | | | |
| 7033 | 38- | 276- | 52- | | | | | | | | | |
| 7036 | | 300- | | | | | | | | | | |
| 7039 | 17- | | 37- | | | | | | | | | |
| 7045 | | 427- | | | | | | | | | | |
| 7051 | 250- | | 320- | | | | | | | | | |
| 7057 | 500- | 1,750- | | | | | | | | | | |
| 7060 | | | 1,000- | | | | | | | | | |
| PERSONL EXP | 1,452 | 3,795 | 1,911 | | | | | | | | | |

Figure 4D

FAST FINANCIALS RECAP BY MONTH - 4129282850 KELLY CANDY

THIS RECAP REFLECTS DOLLAR AMOUNTS ONLY - ALL CENT AMOUNTS HAVE BEEN DROPPED FROM REPORT EXCEPT FOR BALANCE AMOUNTS AT THE END OF REPORT.

| CATEGORY | JAN | FEB | MAR | APR | MAY | JUN | JUL | AUG | SEP | OCT | NOV | DEC |
|---|---|---|---|---|---|---|---|---|---|---|---|---|
| 9003 | | | 416- | | | | | | | | | |
| 9004 | | 15,000- | | | | | | | | | | |
| 9005 | 5,000- | | | | | | | | | | | |
| 9010 | | | 4,200- | | | | | | | | | |
| DEPR ASSET STRAGHT LN | 5,000 | 15,000 | 4,616 | | | | | | | | | |

Figure 4E

FAST FINANCIALS RECAP BY MONTH -- 4129282850 KELLY CANDY

THIS RECAP REFLECTS DOLLAR AMOUNTS ONLY - ALL CENT AMOUNTS HAVE BEEN
DROPPED FROM REPORT EXCEPT FOR BALANCE AMOUNTS AT THE END OF REPORT.

| CATEGORY | JAN | FEB | MAR | APR | MAY | JUN | JUL | AUG | SEP | OCT | NOV | DEC |
|---|---|---|---|---|---|---|---|---|---|---|---|---|
| SYS BAL | 928.43 | | 30,608.63 | | | | | | | | | |
| ENT BAL | 928.43 | | 30,608.63 | | | | | | | | | |
| RESULT | BAL | | BAL | 30,608.63 | | | | | | | | |
| | | | | | | | | | | | | |
| SYS BAL | | 6,938.18- | | | | | | | | | | |
| ENT BAL | | 6,938.18- | | | | | | | | | | |
| RESULT | | BAL | 30,608.63 | | | | | | | | | |

DEPRECIATION
| | | | | | | | | | | | | |
|---|---|---|---|---|---|---|---|---|---|---|---|---|
| 9003 | | | 12 | | | | | | | | | |
| 9004 | 83 | 83 | 83 | | | | | | | | | |
| 9005 | | 313 | 313 | | | | | | | | | |
| 9010 | | | 35 | | | | | | | | | |
| | | | | | | | | | | | | |
| MONTH | 83 | 396 | 443 | | | | | | | | | |
| YTD | | 479 | 922 | | | | | | | | | |

Figure 4F

JANUARY THRU DECEMBER - SALES TRANSACTIONS BY CATEGORY - 4129282850 KELLY CANDY

| DATE | DEPOSIT # | AMOUNT | | DATE | DEPOSIT # | AMOUNT |
|---|---|---|---|---|---|---|
| 1010 SALES (TAXABLE) | | | | | | |
| 0100 SWEET TOOTH | | | | 0106 ALLEGHENY SWEETS | | |
| 01/26/88 | 1243 | 2,000.00 | | 01/15/88 | 1178 | 1,300.00 |
| 03/02/88 | 1822 | 2,000.00 | | 03/11/88 | 1841 | 396.50 |
| 03/25/88 | 1901 | 2,000.00 | | 0106 CUSTOMER TOTAL.... | | $ 1,696.50 |
| 0100 CUSTOMER TOTAL.... | | $ 6,000.00 | | | | |
| | | | | 0107 JOHNSON'S STORE | | |
| 0101 THE SWEET SHOP | | | | 02/11/88 | 1627 | 1,861.00 |
| 01/08/88 | 1027 | 800.25 | | 03/25/88 | 1907 | 5,511.00 |
| 02/16/88 | 1644 | 1,150.00 | | 0107 CUSTOMER TOTAL.... | | $ 7,372.00 |
| 0101 CUSTOMER TOTAL.... | | $ 1,950.25 | | | | |
| | | | | 0108 ELM STREET CONFECTIONS | | |
| 0102 DIMLING'S | | | | 02/12/88 | 1634 | 969.75 |
| 01/10/88 | 1088 | 465.00 | | 03/12/88 | 1850 | 1,396.00 |
| 0102 CUSTOMER TOTAL.... | | $ 465.00 | | 0108 CUSTOMER TOTAL.... | | $ 2,365.75 |
| | | | | | | |
| 0103 LICORICE, IND | | | | 0109 WHITMAN'S | | |
| 01/13/88 | 1102 | 376.22 | | 02/15/88 | 1642 | 2,750.50 |
| 0103 CUSTOMER TOTAL.... | | $ 376.22 | | 0109 CUSTOMER TOTAL.... | | $ 2,750.50 |
| | | | | | | |
| 0104 CONVENIENCE STORE CO | | | | 0110 OAKTREE FUDGES | | |
| 01/15/88 | 1180 | 1,800.00 | | 02/18/88 | 1670 | 4,225.00 |
| 0104 CUSTOMER TOTAL.... | | $ 1,800.00 | | 03/13/88 | 1856 | 1,875.41 |
| | | | | 0110 CUSTOMER TOTAL.... | | $ 6,100.41 |
| 0105 PGH DRUGS | | | | | | |
| 01/15/88 | 1175 | 1,612.50 | | 0111 ICE CREAM & MORE | | |
| 02/20/88 | 1673 | 1,407.60 | | 02/25/88 | 1688 | 8,100.00 |
| 03/12/88 | 1848 | 5,553.42 | | 0111 CUSTOMER TOTAL.... | | $ 8,100.00 |
| 0105 CUSTOMER TOTAL.... | | $ 8,573.52 | | | | |

CONTINUED AT THE TOP

Figure 5A

JANUARY THRU DECEMBER -- SALES TRANSACTIONS BY CATEGORY -- 4129282850 KELLY CANDY

| | DATE | DEPOSIT # | AMOUNT | DATE | DEPOSIT # | AMOUNT |
|---|---|---|---|---|---|---|
| 0112 | IDEAL FOODS | | | | | |
| | 03/09/88 | 1803 | 6,200.45 | | | |
| | 0112 CUSTOMER TOTAL..... | | $ 6,200.45 | | | |
| 0113 | EVERETT 5¢ & 10¢ | | | | | |
| | 03/10/88 | 1817 | 475.00 | | | |
| | 0113 CUSTOMER TOTAL..... | | $ 475.00 | | | |
| 0115 | WILSON FOODS | | | | | |
| | 03/27/88 | 1921 | 6,721.35 | | | |
| | 0115 CUSTOMER TOTAL..... | | $ 6,721.35 | | | |
| 0116 | VALLEY DAIRY | | | | | |
| | 03/27/88 | 1928 | 12,341.00 | | | |
| | 0116 CUSTOMER TOTAL..... | | $12,341.00 | | | |
| 0117 | COTTON CANDY KIDS | | | | | |
| | 03/28/88 | 1936 | 12,740.40 | | | |
| | 0117 CUSTOMER TOTAL..... | | $12,740.40 | | | |
| 1010 CATEGORY TOTAL.................. | | | $86,028.35 | | | |
| 1260 | ESTATE DISTRIBUTION | | | | | |
| | 0118 ESTATE OF THOMAS KELLY | | | | | |
| | 02/14/88 | 1639 | 7,000.00 | | | |
| | 0118 INCOME TOTAL....... | | $ 7,000.00 | | | |
| 1260 CATEGORY TOTAL.................. | | | $ 7,000.00 | | | |

Figure 5B

JANUARY THROUGH DECEMBER - PAID TRANSACTIONS BY CATEGORY
4129282850 - KELLY CANDY

| | Date | Check #/Uniq. | Amount | | Date | Check #/Uniq. | Amount |
|---|---|---|---|---|---|---|---|
| 3005 | RENT | | | | | | |
| | 0003 Pittsburgh Realty | | | | 0053 Carol Furnishings | | |
| | 01/06/88 | 103 | $ 450.00 | | 03/22/88 | 190 | $ 127.00 |
| | 02/06/88 | 135 | 450.00 | | 0053 Payee Total | | $ 127.00 |
| | 03/09/88 | 182 | 450.00 | 3030 | Category Total | | $1,327.00 |
| | 03/24/88 | 193 | 450.00 | 3035 | REPAIRS & MAINTENANCE | | |
| | 0003 Payee Total | | $1,800.00 | | 0027 Keep-it-Clean | | |
| 3005 | Category Total | | $1,800.00 | | 02/05/88 | 134 | $ 110.00 |
| 3015 | UTILITIES | | | | 0027 Payee Total | | $ 110.00 |
| | 0011 West Penn Power | | | 3035 | Category Total | | $ 110.00 |
| | 01/15/88 | 111 | 261.72 | 3045 | MISCELLANEOUS | | |
| | 03/02/88 | 174 | 189.10 | | 0040 American Hardware | | |
| | 0011 Payee Total | | $ 450.82 | | 02/25/88 | 162 | $ 175.00 |
| 3015 | Category Total | | $ 450.82 | | 0044 Payee Total | | $ 175.00 |
| 3020 | TELEPHONE | | | 3045 | Category Total | | $ 175.00 |
| | 0002 Bell Telephone | | | 3050 | OFFICE SUPPLIES | | |
| | 01/04/88 | 102 | 100.00 | | 0010 ABC Office Supplies | | |
| | 03/20/88 | 188 | 60.05 | | 03/01/88 | 171 | $ 250.67 |
| | 0002 Payee Total | | $ 160.05 | | 0010 Payee Total | | $ 250.67 |
| 3020 | Category Total | | $ 160.05 | 3050 | Category Total | | $ 250.67 |
| 3025 | COPIER RENTAL OR PURCHASE PAYMENTS | | | 3055 | PAPER & PRINTING | | |
| | 0004 Mellon Bank | | | | 0010 ABC Office Supplies | | |
| | 01/06/88 | 104 | 138.89 | | 01/15/88 | 110 | $ 52.00 |
| | 02/08/88 | 137 | 138.89 | | 01/27/88 | 126 | 15.60 |
| | 03/12/88 | 185 | 138.89 | | 0010 Payee Total | | $ 67.60 |
| | 03/28/88 | 197 | 138.89 | | 0013 American Paper | | |
| | 004 Payee Total | | $ 555.56 | | 01/16/88 | 113 | $ 275.00 |
| 3025 | Category Total | | $ 555.56 | | 0013 Payee Total | | $ 275.00 |
| 3030 | FURNITURE & FIXTURES | | | 3055 | Category Total | | $ 342.60 |
| | 0010 ABC Office Supplies | | | | | | |
| | 03/01/88 | 171 | 1,200.00 | | | | |
| | 00100 Payee Total | | $1,200.00 | | | | |

Figure 6A

```
3060  POSTAGE & EXPRESS                              3550  MEALS AND ENTERTAINMENT (80%)
      0012  U.S. Postal Service                            0009  Visa Mastercard
            01/15/86  112         75.00                          01/11/88  109              $    35.00
      0012  Payee Total        $  75.00                    0009  Payee Total                $    35.00
      0048  Federal Express                           3550  Category Total                  $    35.00
            02/27/88  167          9.00
            03/22/88  191         18.00               3560  Lodging
            03/22/88  195          9.00                     0009  Visa Mastercard
            03/26/88             36.00                            01/11/88  122                 71.00
      0048  Payee Total        $  36.00                            01/24/88  122                 42.00
3060  Category Total           $ 111.00                    0009  Payee Total                $   113.00
                                                      3560  Category Total                  $   113.00
3065  OTHER SUPPLIES
      0046  Forbes                                    3570  OTHER TRAVEL & ENTERTAINMENT
            02/26/88  164         31.00                     0031  Marriott, Inc.
      0046  Payee Total        $  31.00                            03/21/88  189                 82.00
3065  Category Total           $  31.00                    0031  Payee Total                $    82.00
                                                      3570  Category Total                  $    82.00
3310  MEETING EXPENSE
      0031  Marriott, Inc.                            3830  Co-op Costs
            02/14/88  144        165.00                     0028  Licorice, Inc.
      0031  Payee Total        $ 165.00                            02/07/88  136             $   400.00
3310  Category Total           $ 165.00                    0028  Payee Total                $   400.00
                                                            0042  The Sweet Shop
3530  AUTO EXPENSES                                               02/24/88  160                 350.00
      0009  Visa Mastercard                                 0042  Payee Total                $   350.00
            03/06/88  179         27.50
      0009  Payee Total        $  27.50                    0043  Ideal Foods
      0015  Exxon                                                 02/25/88  161                 600.00
            01/20/88  115         42.25                    0043  Payee Total                $   600.00
            03/03/88  176         16.75              3830  Category Total                  $ 1,350.00
                                 59.00
      0015  Payee Total        $  86.50               4010  Officers' Salaries
3530  Category Total           $  86.50                     0019  John Kelly
                                                                  01/25/88  123                2,000.00
3540  OTHER TRANSPORTATION                                         02/16/88  146                2,000.00
      0047  USAir                                                 03/02/88  173                2,000.00
            02/27/88  165        225.00                     0019  Payee Total                $ 6,000.00
      0047  Payee Total        $ 225.00              4010  Category Total                  $ 6,000.00
3540  Category Total           $ 225.00
```

Figure 6B

```
4020  PAYROLL
      0004  Mellon Bank
            03/12/88  185                  41.67
       004 Payee Total              $      41.67
      0038  Mary Lou Cassidy
            02/20/88  155                 300.00
            03/29/88  198                 240.00
      0038 Payee Total               $    540.00
4020 Category Total                  $    581.67

4030  PAYROLL TAXES
      0020  Pa. Dept. of Revenue
            01/25/88  124                  45.00
            03/05/88  173                 345.00
      0020 Payee Total               $    390.00
4030 Category Total                  $    390.00

4050  PENSION AND PROFIT SHARING
      0025  Kelly Pensions
            02/01/88  131               1,500.00
      0025 Payee Total              $1,500.00
4050 Category Total                $1,500.00

4070  HEALTH INSURANCE
      0021  Blue Cross/Blue Shield
            01/26/88  125                 189.00
            02/17/88  147                 189.00
            03/07/88  180                 189.00
      0021 Payee Total               $    567.00
4070 Category Total                  $    567.00

4310  PROPERTY
      0008  All State Insurance
            01/11/88  108                 700.00
      0008 Payee Total               $    700.00
4310 Category Total                  $    700.00

4340  FIRE
      0008  All State Insurance
            01/11/88  108                 400.00
      0008 Payee Total               $    400.00
4340 Category Total                  $    400.00

4520  LEGAL
      0052  ABE Schwartz, Attorney
            03/15/88  187                 250.00
      0052 Payee Total               $    250.00
4520 Category Total                  $    250.00

4530  ACCOUNTING
      0024  Richard Scherer, CPA
            02/01/88  130                 225.00
      0024 Payee Total               $    225.00
4530 Category Total                  $    225.00

4820  INTEREST ON BANK LOANS
      0004  Mellon Bank
            01/06/88  104                  41.67
            02/04/88  132                 627.50
            02/08/88  137                  41.67
            03/28/88  197                  41.67
      0004 Payee Total               $    752.51
4820 Category Total                  $    752.51

5050  SALES TAX
      0020  Pa. Dept. of Revenue
            03/30/88  199               3,761.00
      0002 Payee Total              $3,761.00
            0037 Main Street Ford
            02/20/88  154                 750.00
      0037 Payee Total               $    750.00
5050 Category Total                $4,511.00

5320  INSURANCE
      0054  Sun Life Insurance
            03/23/88  192               2,400.00
      0054 Payee Total              $2,400.00
5320 Category Total                $2,400.00

5520  BANK CHARGES
      0004  Mellon Bank
            03/27/88  196                  16.00
      0004 Payee Total               $     16.00
5520 Category Total                  $     16.00
```

Figure 6C

```
5530 FREIGHT
     0017 General Transport
          01/21/88   118                87.00
          02/09/88   139                95.00
          02/12/88   141                55.00
          03/12/88   134                67.00
          0017 Payee Total       $    304.00
     0030 Bayou Transport
          02/12/88   143               215.00
          0030 Payee Total       $    215.00
5530 Category Total               $    519.00

6010 MARSHMELLOW CREME
     0016 American Wholesalers
          01/20/88   117               290.00
          02/12/88   200               310.00
          01/29/88   140               401.00
          0016 Payee Total       $  1,001.00
6010 Category Total               $  1,001.00

6012 SUGAR
     0016 American Wholesalers
          02/12/88   117               350.00
          02/12/88   138               400.00
          02/10/88   201               250.00
          02/12/88   140               429.00
          03/10/88   183               325.00
          0016 Payee Total       $  1,754.00
6012 Category Total               $  1,754.00

6015 CHERRIES
     0016 American Wholesalers
          02/09/88   138               375.00
          0016 Payee Total       $    375.00
6015 Category Total               $    375.00

6018 SOLID CHOCOLATE
     0029 Sugar, Inc.
          02/01/88   202               800.00
          02/07/88   222               300.00
          02/12/88   142               500.00
```

```
          02/28/88   280             1,600.00
          0029 Payee Total       $  3,200.00
6018 Category Total               $  3,200.00

6020 MOLASSES
     0016 American Wholesalers
          03/10/88   183               300.00
          0016 Payee Total       $    300.00
6020 Category Total               $    300.00

6040 CASHEW PIECES
     0039 Flavor-Full
          02/01/88   223               400.00
          02/21/88   156               300.00
          02/25/88   229               525.00
          02/28/88   235               400.00
          0039 Payee Total       $  1,625.00
6040 Category Total               $  1,625.00

6050 CARAMEL SAUCE
     0026 Brown Bag, Inc.
          02/04/88   133               250.00
          02/12/88   241               300.00
          02/19/88   245               350.00
          02/18/88   252               300.00
          0026 Payee Total       $  1,200.00
6050 Category Total               $  1,200.00

7003 FOOD
     0001 Food Giant
          01/03/88   101                96.25
          01/23/88   120                47.75
          01/28/88   127                60.06
          02/19/88   149                65.37
          02/27/88   166                47.89
          03/12/88   186                72.12
          0001 Payee Total       $    389.44
     0050 Foodland
          02/28/88   170               120.55
          0050 Payee Total       $    120.55
7003 Category Total               $    509.99
```

Figure 6D

```
7006 CLOTHING
     0009 Visa Mastercard
          03/06/88  179           95.00
          0009 Payee Total    $   95.00
     0033 Horne's
          02/18/88  148          125.00
          0033 Payee Total    $  125.00
     7006 Category Total      $  220.00

7009 MEDICAL/DENTAL
     0018 Wilson, M.D.
          01/22/88  119           30.00
          0018 Payee Total    $   30.00
     0040 Pittsburgh Drugs
          02/23/88  158           26.50
          0040 Payee Total    $   26.50
     0049 Hiway Drugs
          02/28/88  169           61.20
          0049 Payee Total    $   61.20
     7009 Category Total      $  117.70

7012 EDUCATION
     0014 Pgh. Assoc. of Realtors
          01/19/88  114           50.00
          0014 Payee Total    $   50.00
     7012 Category Total      $   50.00

7015 HOME MAINTENANCE/REPAIR
     0007 K-Mart
          01/09/88  107           61.20
          0007 Payee Total    $   61.20
     0032 James Builders
          02/15/88  145          360.00
          0032 Payee Total    $  360.00
     0036 X-Pert Lawn Care
          02/20/88  153           75.75
          0036 Payee Total    $   75.75
     7015 Category Total      $  496.95

7018 DONATIONS
     0006 United Way
          01/08/88  106          100.00
          0006 Payee Total    $  100.00
     0034 Salvation Army
          02/20/88  150           75.00
          0034 Payee Total    $   75.00
     7018 Category Total      $  175.00

7021 HOME UTILITIES
     0011 West Penn Power
          01/20/88  116          135.40
          03/08/88  181          185.55
          0011 Payee Total    $  320.95
     7021 Category Total      $  320.95

7024 CREDIT CARDS
     0009 Visa Mastercard
          01/24/88  122           67.50
          0009 Payee Total    $   67.50
     7024 Category Total      $   67.50

7027 VACATION/ENTERTAINMENT
     0041 USA Today
          02/23/88  159           51.00
          0041 Payee Total    $   51.00
     0045 The Golf Shop
          02/25/88  163           36.00
          0045 Payee Total    $   36.00
     7027 Category Total      $   87.00

7030 Dues/Membership
     0014 Pgh. Assoc. of Realtors
          03/02/88  174          150.00
          0014 Payee Total    $  150.00
     7030 Category Total      $  150.00

7033 AUTOMOBILE
     0015 Exxon
          01/20/88  115           38.75
          03/03/88  176           52.90
          0015 Payee Total    $   91.65
```

Figure 6E

```
       0035 Frank's Repair
            02/20/88   151                    276.80
            0035 Payee Total              $   276.80
7033 Category Total                       $   368.45

7036 TAXES
       0023 City of Pittsburgh
            02/01/88   129                    300.00
            0023 Payee Total              $   300.00
7036 Category Total                       $   300.00

7039 TELEPHONE
       0002 Bell Telephone
            01/04/88   102                     17.50
            03/20/88   188                     37.96
            0002 Payee Total              $    55.46
7039 Category Total                       $    55.46

7045 FURNITURE/FIXTURES
       0033 Horne's
            02/20/88   152                    427.34
            0033 Payee Total              $   427.34
7045 Category Total                       $   427.34

7051 INSURANCE
       0008 All State Insurance
            01/24/88   121                    250.00
            0008 Payee Total              $   250.00
       0054 Sun Life Insurance
            03/25/88   194                    320.00
            0054 Payee Total              $   320.00
7051 Category Total                       $   570.00

7057 CHECKS FOR CASH
       0022 Cash
            01/29/88   128                    500.00
            02/22/88   157                    750.00
            02/27/88   168                  1,000.00
            0022 Payee Total              $ 2,250.00
7057 Category Total                       $ 2,250.00

7060 FOR TRANSFER TO SAVINGS
       0051 Mellon Savings Account
            03/04/88   177                  1,000.00
            0051 Payee Total              $ 1,000.00
7060 Category Total                       $ 1,000.00

9003 THREE YEAR - STRAIGHT LINE
       0053 Carol Furnishings
            03/22/88   190                    416.00
            0053 Payee Total              $   416.00
9003 Category Total                       $   416.00

9004 FOUR YEAR - STRAIGHT LINE
       0037 Main Street Ford
            02/20/88   154                 15,000.00
            0037 Payee Total              $15,000.00
9004 Category Total                       $15,000.00

9005 FIVE YEAR - STRAIGHT LINE
       0005 Xerox
            01/06/88   105                  5,000.00
            0005 Payee Total              $ 5,000.00
9005 Category Total                       $ 5,000.00

9010 TEN YEAR - STRAIGHT LINE
       0032 James Builders
            03/01/88   172                  4,200.00
            0032 Payee Total              $ 4,200.00
9010 Category Total                       $ 4,200.00
```

Exhibit 6F

```
JANUARY THRU DECEMBER  -  PAID TRANSACTIONS BY CATEGORY - 4129282850    KELLY CANDY

DATE      CHECK #/UNIQ      AMOUNT

03/22/88       190              416.00
         0053 PAYEE TOTAL........       $416.00
9003 CATEGORY TOTAL................     $416.00

9004  4 YEAR-STRAIGHT LINE
      0037 MAIN STREET FORD
         02/20/88       154          15,000.00
         0037 PAYEE TOTAL........   $15,000.00
9004 CATEGORY TOTAL................ $15,000.00

9005  5 YEAR-STRAIGHT LINE
      0005 XEROX
         01/06/88       105           5,000.00
         0005 PAYEE TOTAL........    $5,000.00
9005 CATEGORY TOTAL................  $5,000.00

9010 10 YEAR-STRAIGHT LINE
      0032 JAMES BUILDERS
         03/01/88       172           4,200.00
         0032 PAYEE TOTAL........    $4,200.00
9010 CATEGORY TOTAL................  $4,200.00
```

\*\*\* END OF REPORTS \*\*\*

FIGURE 6G

JOB PROFIT THROUGH MARCH
4129282850 KELLY CANDY

| Date | Check No. | Amount | Category | Payee |
|---|---|---|---|---|
| JOB #100 (WHITMAN'S) | | | | |
| 01/20/88 | 117 | 290.00 | 6010 - MARSHMALLOW CREMES | 0016 - AMERICAN WHOLESALERS |
| 02/09/88 | 138 | 400.00 | 6012 - SUGAR | 0016 - AMERICAN WHOLESALERS |
| 02/12/88 | 142 | 500.00 | 6018 - SOLID CHOCOLATE | 0029 - SUGAR, INC. |
| 02/01/88 | 223 | 400.00 | 6040 - CASHEW PIECES | 0039 - FLAVOR FULL |
| JOB #100 TOTALS | | | | |
| INCOME | | $2,750.50 | | |
| EXPENSE | | 1,590.00 | | |
| PROFIT | | 1,160.50 | GROSS PROFIT % 42.19 | |
| | | | | |
| JOB # 152 (OAKTREE FUDGES) | | | | |
| 01/29/88 | 200 | 310.00 | 6010 - MARSHMALLOW CREMES | 0016 - AMERICAN WHOLESALERS |
| 02/10/88 | 201 | 250.00 | 6012 - SUGAR | 0016 - AMERICAN WHOLESALERS |
| 02/07/88 | 222 | 300.00 | 6018 - SOLID CHOCOLATE | 0029 - SUGAR, INC. |
| 02/04/88 | 133 | 250.00 | 6050 - CARAMEL SAUCE | 0026 - BROWN BAG, INC. |
| JOB # 152 TOTALS | | | | |
| INCOME | | $1,875.41 | | |
| EXPENSE | | 1,100.00 | | |
| PROFIT | | 775.41 | GROSS PROFIT % 41.35 | |

Figure 7

ACCOUNTING SYSTEM

This application is a continuation of our copending application Ser. No. 280,220, filed Dec. 5, 1988, which is a continuation-in-part of our copending application Ser. No. 021,249, filed Mar. 3, 1987, both now abandoned.

This application relates to accounting systems suitable for individuals, small businesses, and the like. More particularly, the application relates to use of a computer to produce accounting information and accounting statements by a simplified and standardized entry of information into a computer.

The widespread introduction of digital computers has replaced manual bookkeeping in virtually all businesses of significant size and in many smaller businesses as well. A drawback of computer systems is that the programs are often complex and require significant operator training for efficient and effective operation. Where a full time bookkeeper is required, as in a business, it is not difficult to secure competent computer operators. A different situation is presented, however, in the case of an individual or a small business which requires only a limited amount of bookkeeping services. Many computer accounting programs contemplate the needs of larger businesses. Thus, the reports generated by such programs, while suited to medium and large size businesses are often inappropriate to the needs of very small businesses and individuals. Moreover, many such programs require specialized record keeping and accounting skills to enable the programs to function. For an individual or a small business, however, the keeping of such records in proper form and the entering of them into the computer may involve more effort and complexity than the manual system which the computer is intended to replace. A lack of accounting skills by the user may cause the reports produced to be misleading or inaccurate.

We provide a method of monitoring accounts and producing accounting reports based upon a bank statement and bank entries. We provide a standardized menu, including predefined group category codes, for a computer system. We enter account information into the computer, enter a bank statement balance into the computer, and enter bank account entries into the computer. We maintain a file by account and enter account information into the computer. We further maintain a payee file and enter payee information into the computer. We preferably provide means to verify customer file inputs, account file inputs, and payee file inputs. We further preferably enter expense category information into the computer. We verify the total expense categories for each bank check against the total amount of the check. We may provide expense sub-categories by which expenses can be identified by categories, by sub-categories, or both. We further verify the total of expense and income entries against the current bank statement balance. Thereafter, we produce one or more printed reports. We produce a suspense listing, a monthly statement of bank account activity, a bank accounting recapitulation, a listing of payments made by category, and a listing of income by category.

In the accompanying drawings, we have illustrated our invention in which:

FIGS. 2A, 2B, 2C and 2D shows a table of standard category codes;

Figure 1A:
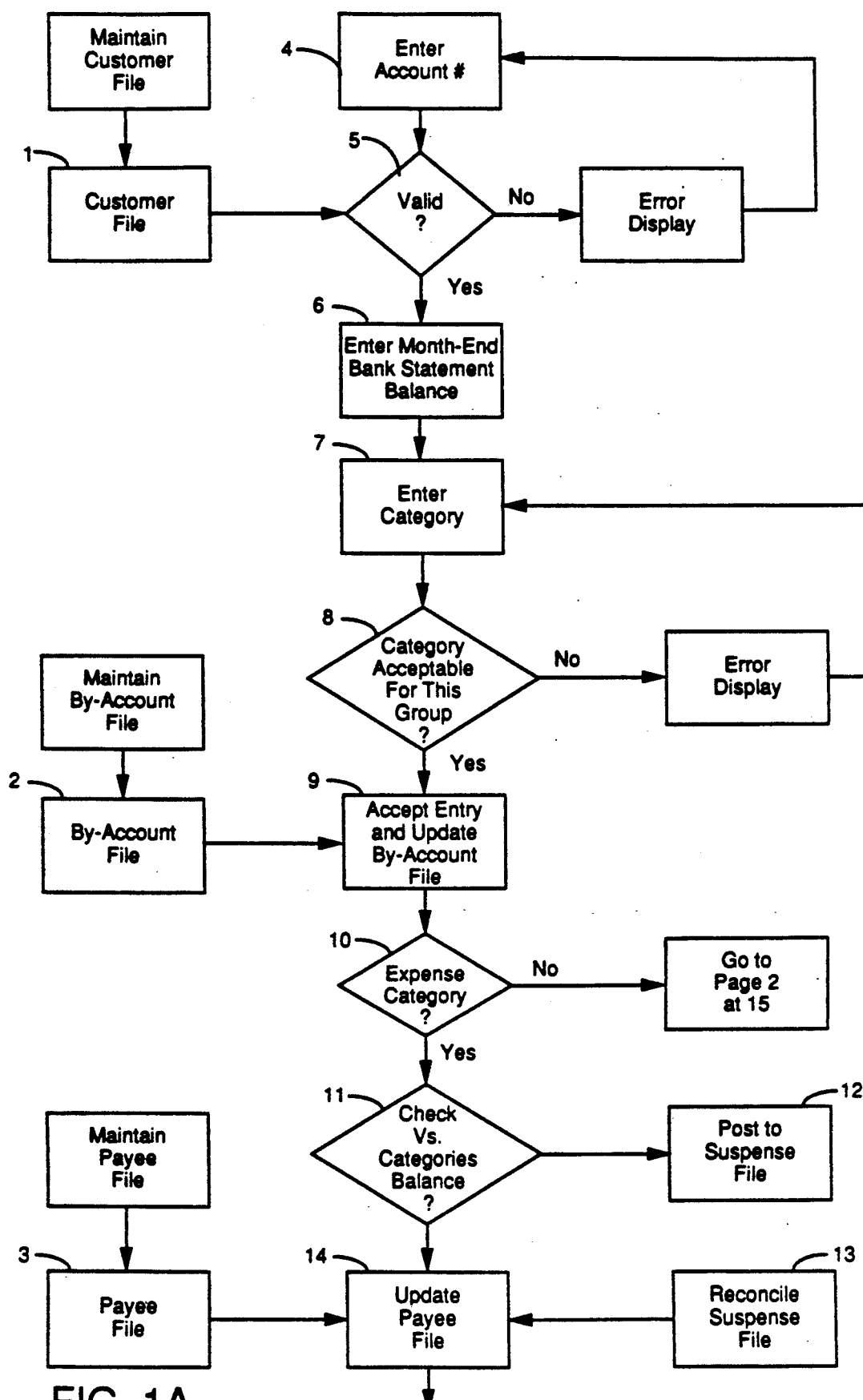
FIGS. 1A and 1B show a schematic flow chart.
Figure 1B:
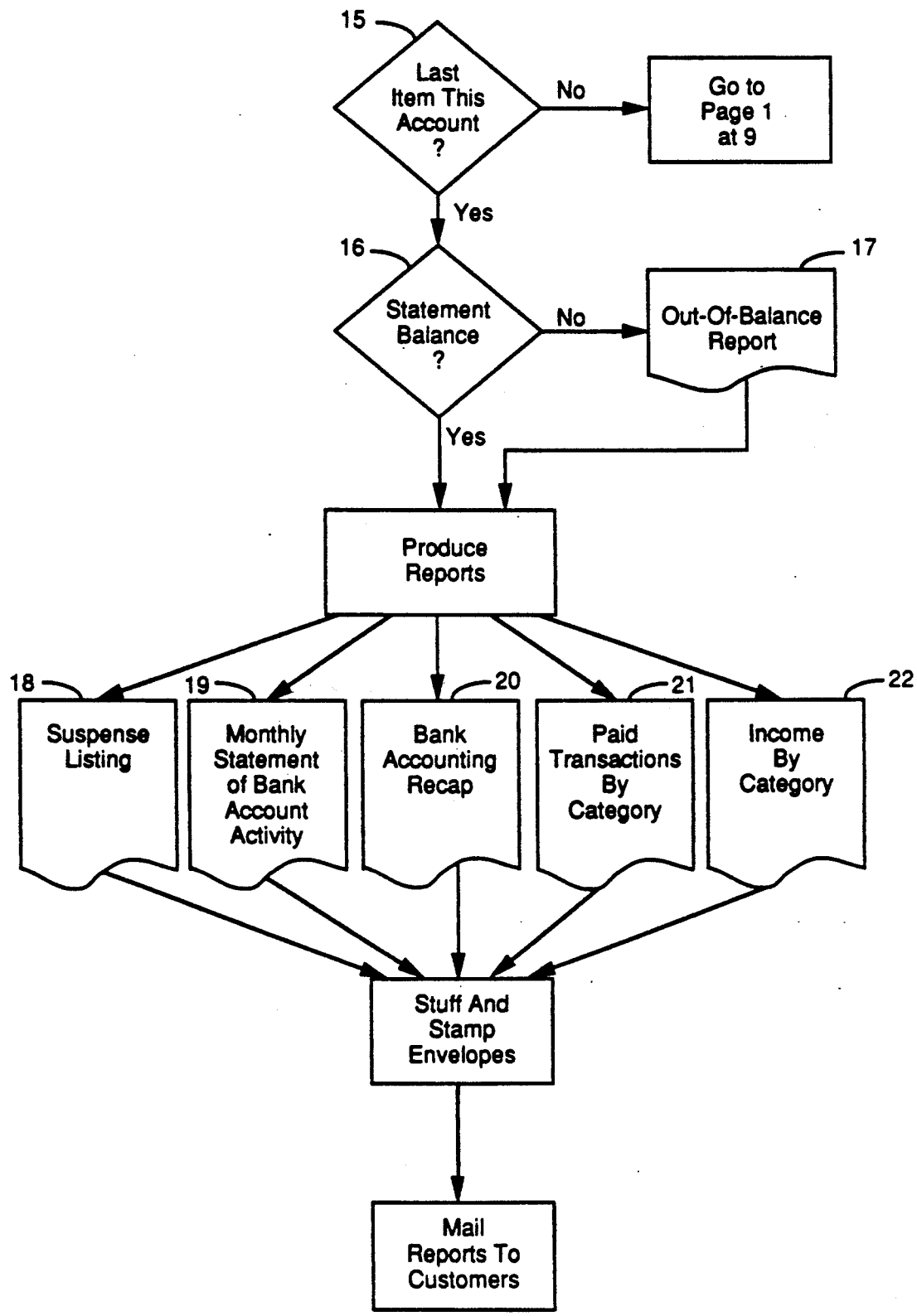

FIGS. 3A, 3B, and 3C show a recapitulation of all expenses by category for the current and previous years;

FIGS. 4A, 4B, 4C,,4D, 4E, and 4F show expenses on a monthly basis by category and also by group category;

FIGS. 5A and 5B show sales for the year by customer category;

FIGS. 6A through 6B show paid transactions by category and by transaction; and

FIG. 7 shows expense detail, income, and profit per job.

A customer file 1, a by-account file 2, and a payee file 3 are maintained in the computer system. In order to produce the desired reports for a customer, it is essential that the customer have all pertinent data entered into the computer. Since the typical customer will be an individual or small business which does not own and operate a computer, it is usual that the computer will be maintained and operated at a service center remote from the customer. It is essential to satisfactory operation of the computer that all necessary data be transmitted to the service center and entered into the computer. The customer might, for example, mail hard copy such as checks, deposit slips, and check stubs to the service center for entry and input by a service center operator. Alternatively, the customer might transmit the information by telephone to the service center where the information is preferably recorded and then transcribed into the computer by an operator at the service center. Further, the customer might directly enter the data into the computer by telephone using a telephone keypad or microcomputer keyboard.

In the simplest form, the coding is placed on the check stub or voucher when each check is written, and also directly on each deposit ticket. Copies of the check stubs and deposit tickets are transmitted to the service center on a frequent and timely basis. That provides the essential data from which reports and accounting statements are prepared.

The starting point for any entry is the customer account number which is first entered as shown at 4. The computer will then compare the account number against the customer file at 5. If a valid account number has not been entered, that will be displayed on the operator's screen, or by audible signal to permit the account number to be reentered. When the computer verifies that the account number is valid, a further signal may be given that the computer is ready to receive the next entry which is the month end bank statement balance as at 6.

A standard and predetermined list of category codes is prepared and is entered into the computer data bank. Thereafter, individual expense and income items are entered into the computer in accordance with the standard code. The first part of the entry is a category code at 7. Expense categories for a customer might, by way of example, include such things as electric power, water, real estate tax, and interest paid. Income categories might include such items as wages, dividends, rentals, and payment for services. The code for each customer is associated with a group which is fitted to the activity and needs of customers having similar business activities. A customer might be placed in a standard group suited to the customer's needs. A self employed professional, for example, would have different categories of income than an employee, or a merchant or a tradesman. A home owner would be expected to have different expense categories than an apartment dweller. A customer might be the sole member of a group whose entries correspond to that customer's needs. Thus, standard groups can be programmed, but special programs can be tailored to meet special needs of individual customers.

The expense categories may include a secondary classification which identifies an identifiable sub-category such as a particular job, or project, or branch store. Thus items of expense are identifiable both by the category and sub-category. In this manner, all expenses of a particular type may be identified and all expenses to a particular job or project may be identified.

Expenses for purchases which are depreciable may be indicated by a code for any standard depreciation schedule.

Expense items can be coded to show inventory purchases by category or item. Accordingly, such purchases will be added to the inventory level. If periodic adjustments are made for sales, damage, theft, etc., the net amount will show the inventory.

The category which is entered as part of each entry is compared at 8 to all listed categories of the group to which the customer belongs. If the category of the entry is not proper, an error signal will be given and entry will be refused. For example, if a telephone bill of an individual is incorrectly coded as typewriter repairs which might be appropriate for a business, the entry would be rejected. If the category is acceptable for the group, then the entry will be stored in by-account file 2, and the by-account file will be updated as shown at 9. The next step 10 is to determine if the entry was an expense item. If the entry is not an expense item, the entry is for income which goes to 15.

The group category codes permit a certain degree of individual variation in accounting reporting (e.g. job numbers), but require all participants in the accounting process (bookkeepers, bank personnel, and tax advisors) to conform to a specific set of accounting codes and principles which, in turn, are requisite to the handling of large volumes of financial data economically.

The standardized group category codes also permit the inclusion of noncash items through a matrix of depreciation methods and periods as established by the check writer at time of payment. Balances are subsequently carried forward automatically for reporting each month and for year-end tax preparation. Year-end tax accounting costs are thereby reduced. Accurate monthly financial statements can be generated using an on-site computer or an outide accounting service operating via computer or an internal reconciliation process done by hand.

A bank check or a deposit ticket may represent more than one category. For example, a single check drawn by a customer to a savings and loan institution might represent payment of interest on a mortgate, payment of principal, and payment to an escrow account from which real estate taxes on the mortgaged premises are paid. The total of the check and the total of the categories represented by that check are balanced at 11. If they do not balance, the items are posted to a suspense file 12 for reconciliation by the customer. After reconciliation 13, the payee file is updated at 14. If the check total and category totals do balance, the payee file is then updated.

If a further item is to be entered, the entry is made at 9 and the intervening process is repeated as many times as necessary until all of the entries have been made at 15. A computer statement balance is then prepared at 16 based on the balance at the end of the previous period. If the statement balance does not match the bank statement balance, then an out-of-balance report is prepared at 17. Out-of-balance would commonly be caused by checks which have been written and entered into the checkbook but which have not cleared and been paid by the bank at the time the bank statement is produced. Thereafter, reports are produced as desired. The reports may include a suspense listing 18, a statement of bank account activity 19, a bank accounting recapitulation 20, a paid transaction by category report 21, an income by category report 22, and a secondary classification report 23. By incorporating depreciation and inventory levels, an income statement 24 may be generated. The reports are stuffed into envelopes, the envelopes are stamped and mailed to the customer.

The opportunity to place more than one number on a check (or a deposit ticket) at its writing to denote both cash and noncash portions for an expenditure (or a revenue) could not be feasibly performed without the use of a standardized list of group category codes. The system permits balancing of income and expense amounts with the bank statement record at month-end. For accrual accounting purposes, however, amounts designated as standardized noncash group category codes whether a check or deposit in whole or in part are deducted from or added to income in accordance with the tax method already elected, generating periodic income and expense statements in accord with generally accepted accounting principles. No separate system of accounts or reconciliation of cash and noncash items is required.

The present invention provides for a basic inventory system. Through the Category 6000 Inventory Code, the system can track dollar inventory investments for 200 (or more) individual products or product grouping. Although individual units are not tracked as sales and receipts occur, monthly expenditures for such items are summarized and where depletion, depreciation or amortization should be added or deducted, the system automatically carries forward appropriate amounts.

The system may be used to distinguish between business and personal incomes and expenditures without the need to establish a duplicate system of accounts. The Category 7000 Personal Expense Codes offer a way to segregate personal/family expenses in situations where one checking account is used for both business and personal transactions. For example, a credit card payment may be segmented into more than one expenditure type. A $1000 credit card payment may include the following:

| | |
|---|---|
| $ 100 for category #7130 | Personal Food and groceries |
| 150 for category #7160 | Personal legal expenses |
| 250 for category #4520 | Company legal expenses |
| 50 for category #3550 | Company restaurant charge |
| 450 for category #3060 | Desk (office furniture) |
| $1,000 | |

The business and personal expenses are segregated automatically for monthly summarization and review. The business expenses which are deductible in the current period are so deducted. The asset purchase portion of the $1000 payment is (by the election of Asset Code #9005) carried forward on a five-year straight line depreciation basis in calculating the periodic income and expense statement. The entire $1000 expenditure is included in the automatic bank statement reconciliation process during the period in which the expenditure took place. The month-end summary reports delineate expenditures by category for comparison and control purposes.

Business, personal, cash and noncash accounts established in a computer system or without the use of a computer must be utilized and integrated in such a manner as to result in a meaningful system of accounting. That system must primarily be accurate and, secondly, be feasible to implement. The standardized chart of group category codes programmed with appropriate separations for cash and noncash items and business and personal divisions with specific interrelationships between account categories defined and balances carried forward makes the system work with little input from anyone other than the check writer. In such manner, the costs of implementation are minimized. Conversely, if the standardized group category codes are not entered into a file in the computer and if they are not used by the business or other user of the system, the advantages of the system are lost and the operation essentially becomes one of normal bookkeeping in which the printing and computation function is done by machine. In using the system, the requirement for specialized knowledge (either of accounting or of computers) is reduced. There is no requirement to own a computer. And the ideal location for performing financial accounting/analysis (the financial institution) can be utilized with minimal effort, file input and manpower.

Because the system prompts the user to make simple accounting decisions at checkwriting, one and only one person need be involved. Only one person is involved in computer entry of check amounts into standardized group category codes. Potential for error on key entry is minimized because only a small percentage of group category codes may be personalized and those code numbers are prespecified within major group category headings. Standard computer routines then process the financial data into standardized periodic reports. Both bank personnel and user personnel are able to recognize the standard register of accounts and reports because all users are virtually the same. Bank service costs and accounting personnel are thereby minimized. It is estimated that the method of input and analysis may be provided at a cost of 25 to 50 percent that of most other accounting service systems. Moreover, the system, by design, is also more timely. Monthly statements are prepared for return to the user with the bank statement. Outside accounting service providers usually require 30 to 60 days to supply comparable reports.

In this manner, the customer is able to obtain a set of detailed and informative accounting statements which are based on entries taken from the customer's checks or deposit tickets and the bank statement. The statements can be prepared on a monthly, or quarterly, or other convenient basis. If desired, entries can be made into the computer on a daily or other basis which is more frequent than the period on which reports are generated for the customer. In this manner, entries are kept reasonably current. At the end of the month or other accounting period, the new bank statement balance is entered and the reports are prepared.

The suspense balance reports may be produced and forwarded to the customer for examination and then returned to the computer service center before the final accounting reports are run. Also, periodic and cumulative reports may be prepared. That is, monthly reports may be issued showing figures for the month and also for the year to date. It will also be apparent that the computer can readily be programmed to make additional comparisons regarding the data which have been entered. By way of example only, the percentage which each category of expense bears to the total expense could be listed.

A further advantage of the system relates to the opportunity to track income and expense for individual projects or business activities. Through the insertion of a two digit code (1 through 99) on the check at the end of each group category code, incomes and expenses can be further broken down for month end review of specific projects with the overall business activity. The incomes and expenses for these specific projects are included as part of the overall business record-keeping and analysis and balanced against the bank statement record but such incomes and expenses can also be reported in separate manner for better management control of specific functions. At the time of entry into the system, users identify which projects correspond to particular projects or activities, thus personalizing the system at nominal extra cost to the user. Accounting service bureaus rarely offer such analysis to the small business. Further, the system is able to perform job profit and lost analysis for large numbers of users because of the format developed in its standardized menu of group category codes. Bank processing personnal need only enter the additional two digit code to prompt further computer analysis. At month end, an analysis of project costs and revenues by category is provided to point to specific areas of concern and need for action.

An example of management reports which can be generated is shown in FIGS. 3A, 3B, and 3C, which show all expenses during the month in each established category. The computer accumulates the expenses in each category since the beginning of the accounting or fiscal year and also lists the annual total to date in each category. The listing also shows year to date for the previous year and compares the current year to date with the previous year to date showing the difference between them, either positive or negative. In the example of FIG. 3, the firm was not on the system during the prior year. Accordingly, the previous year is listed as zero in every instance, and the comparative figure is equal to the year to date, i.e., year to date minus zero.

FIG. 4 shows monthly expenses in each group category, and it also enumerizes the groups by subject, such as office expense which is the total of rent, utilities, telephone, copier rental, furniture and fixtures, repairs and maintenance, miscellaneous, office supplies, paper and printing, postage and express, and other supplies which constitute categories 3005 through 3065. The totals provide an accurate picture of cash flow and permit cash flow to be readily controlled. At the end of the cash category, the system balance is given followed by non-cash items such as depreciation. The system balance should equal the bank statement balance as shown on FIGS. 3A and 4F.

A suspense report may be prepared showing differences for each category between actual charges to each account and check amounts. Such a suspense report will reconcile differences between the bank statement balance as shown on FIG. 3A and the system balance as shown on FIG. 4F.

FIG. 5 shows revenues by month, again stated by group category, in this instance the categories being separate customers and other non-customer income sources. A comparison of this report with an invoice file will quickly show overdue bills.

FIG. 6 show paid transactions both by group category and by specific entry of each transaction with the group category. Both the check number and date of each transaction are listed. Also sub-categories are listed where appropriate. The information may readily be restated in form appropriate for an accounting statement.

FIG. 7 brings together expenses and income for particular jobs and shows a computation of profit for each job in absolute and percentage terms.

The foregoing reports are based on providing a standardized category code, coding check stubs, and deposit tickets at the time they are prepared. Those essential steps permit the reports to be prepared promptly at the close of each accounting period, e.g. monthly, thereby giving a prompt and accurate set of reports for management of a business. Also, other types of reports may be prepared if desired.

While we have illustrated and described a present preferred embodiment of our invention, it is to be understood that the invention may be otherwise variously practiced within the scope of the following claims.

We claim:

1. A method of producing through a service company an accounting statement suitable for a customer, such as an individual, a small business and the like, the method comprising the steps of
   providing to the customer a pre-established group of standard category codes,
   entering category codes selected by the customer from the pre-established group into a computer file,
   entering information identifying a customer account into the computer,
   determining the cash balance in the customer account from a bank statement for the account,
   entering into the computer the account balance as shown by the bank statement balance for the account,
   receiving copies of money transfer instructions including at least one category code selected by the customer,
   entering into the computer debits made against the account along with category codes selected by the customer,
   entering into the computer credits made to the account along with category codes selected by the customer,
   holding in the computer prior computer-generated account balances,
   generating, from the entries, reports from one or more of three tiers, namely,
   (a) Income/Expense (cash basis)
   (b) Accruals
   (c) Statistical
   the steps of generating said reports including at least:
   adding to the prior computer-generated account balance the amount of credits to the account, and subtracting the amount of debits represented by the money transfer instructions to obtain an updated computer-generated account balance based on the prior account balance,
   reconciling the computer-generated account balance with the bank statement, and
   printing an account statement.

2. The method of claim 1 in which the check expense data are identified by category and by payee, a listing of paid expenses by category is generated from the entered expense data, and the computer account statement includes a listing of paid transactions by category.

3. The method of claim 2 in which the computer generates at least one of
   a suspense listing,
   a statement of bank activity during the period
   a bank account recapitulation, and
   an income by category listing, and includes such information on the account statement.

4. A method of conducting for a customer through a service company computerized cash accounting which generates accrual and statistical information and which comprises:
   providing an account through a financial institution,
   making financial transactions through said account,
   providing a pre-established group of standard category codes,
   entering said codes into a computer file,
   receiving at the financial institution transaction documents which are coded by the customer according to predetermined classification criteria including the standard category codes,
   providing a computer to receive data and generate reports with respect to said account,
   entering data into said computer representative of each said transaction, said data including the amount and category of each said transaction,
   generating from said entered data reports from one or more of three tiers, namely,
   (a) Income/Expense (cash basis)
   (b) Accruals
   (c) Statistical
   including:
   generating a financial institution account statement showing deposits to the account, withdrawals from the account, and a closing account balance, and
   generating an accounting statement based on the coding for the transactions entered into the computer.

5. The method of claim 4 in which the report includes a listing of paid transactions by category.

* * * * *